United States Patent [19]
Troedsson et al.

[11] 4,196,264
[45] Apr. 1, 1980

[54] ACCELERATION ACTIVATED BATTERY

[75] Inventors: Per Y. Troedsson; Rune E. Hesselberg, both of Jarfalla, Sweden

[73] Assignee: U.S. Philips Corporation, New York, N.Y.

[21] Appl. No.: 952,171

[22] Filed: Oct. 17, 1978

[30] Foreign Application Priority Data

Oct. 18, 1977 [SE] Sweden ............................ 7711701

[51] Int. Cl.² ............................................ H01M 6/38
[52] U.S. Cl. ................................................ 429/114
[58] Field of Search ....................... 429/114, 115, 116

[56] References Cited
U.S. PATENT DOCUMENTS

| 2,674,946 | 4/1954 | Hjelm | 429/115 |
| 3,169,084 | 2/1965 | Sommerman et al. | 429/114 |
| 3,431,147 | 3/1969 | Cleveland | 429/114 |

*Primary Examiner*—Donald L. Walton
*Attorney, Agent, or Firm*—Marc D. Schechter

[57] ABSTRACT

An acceleration activated battery for use in projectiles, comprising a yieldable support plate for an ampule containing electrolyte, the battery being activated during acceleration as a result of yielding of the support plate and breaking of the ampule. The support plate has an aperture terminating in a support surface for the ampule. The plate is in turn supported from a base through a support pin, which is smaller than the aperture and situated opposite the same. The support plate and the support pin are interconnected via yieldable connection parts. When these parts yield during acceleration the support pin penetrates through the aperture and enters into the ampule for causing reliable activation of the battery.

5 Claims, 2 Drawing Figures

ACCELERATION ACTIVATED BATTERY

BACKGROUND OF THE INVENTION

The invention relates to an acceleration activated battery for use in projectiles, comprising an ampule containing a liquid electrolyte, the breaking of the ampule causing the battery cells in the battery to become activated, and an ampule retainer adapted to support the ampule when the battery is unactivated. The retainer is designed to yield to a certain force thereon caused by the acceleration of the projectile, thereby causing the ampule to break and the battery to become activated.

In such batteries it is required that the retainer yield reliably to activate the battery cells as a result of the acceleration imposed upon the battery at the firing of the projectile yet the ampule should not become broken as a result of forces arising during storing and transport of the projectile. Thus, the ampule should not become be broken as a result of impact forces arising from the loading of the projectile into the firing tube, for example in automatic feeding, which impact forces can be appreciable, or as a result of the projectile being dropped to the ground. If the cells are radially arranged around a central space where the ampule is situated, and are open against this space in order to be automatically filled with the electrolyte after the ampule is broken, it is a further problem to ensure an even filling of the cells.

SUMMARY OF THE INVENTION

An object of the invention is to provide a battery construction having a simple and reliable ampule retainer for supporting the ampule in an effective manner in an unactuated condition, but which retainer will yield to an accurately predetermined force in order to produce reliable activation of the battery at a certain point in the firing tube when the projectile, in which the battery is mounted, is fired.

A further object of the invention is to facilitate an even filling of the battery cells in the case where these cells are filled from a central space and are lacking mutual interflow channels.

According to the invention these objects are achieved by providing a retainer comprising a support plate having a support surface for the ampule, which surface is oriented substantially transversely relative to the acceleration direction, in which plate an aperture is made to a certain depth as measured from the support surface, which aperture terminates in the support surface. The retainer further comprises, and the support plate is supported by, a fixed base via a support pin situated opposite to the aperture and being connected to the plate via a yieldable connection part. The transverse dimensions of the support pin are smaller than those of the aperture in the support plate. The distance between the lower side of the support plate and the fixed base is larger than the depth of the aperture in the support plate, so that when the connection part between the support plate and the support pin yields the pin will penetrate through the aperture and enter into the ampule.

By virtue of this construction of the ampule retainer a very reliable breaking of the ampule is achieved, by virtue of the fact that the support plate, after the yielding of the retainer, will be pressed against the bottom of the central space where the ampule is situated, the liquid from the ampule cannot accumulate on the bottom but is instead forced to flow directly into the cells, which results in a more even filling of the cells.

A very simple construction is achieved if the retainer is made in one piece and the connection part between the support pin and the plate is formed by a substantially plane ring-shaped thinned material piece extending from the upper side of the support pin, which simultaneously forms the bottom of the aperture, to the support plate at the lower side of the same.

In case the ampule is substantially cylindric and has a substantially plane bottom this plane bottom can suitably bear against the upper side of the support plate, while the aperture in the plate and the support pin are situated substantially centrally in the plate. Using this construction, the large bearing surface between the plane ampule bottom surface and the plane support plate will result in and ampule being supported in a very shock-proof manner before the yielding of the retainer and will therefore withstand strong shocks and vibrations. When the retainer yields, however, the support pin will penetrate into a very fragile part of the ampule.

BRIEF DESCRIPTION OF THE DRAWINGS

The invention is illustrated in the accompanying drawing, in which.

DESCRIPTION OF THE PREFERRED EMBODIMENT

Figure 1:
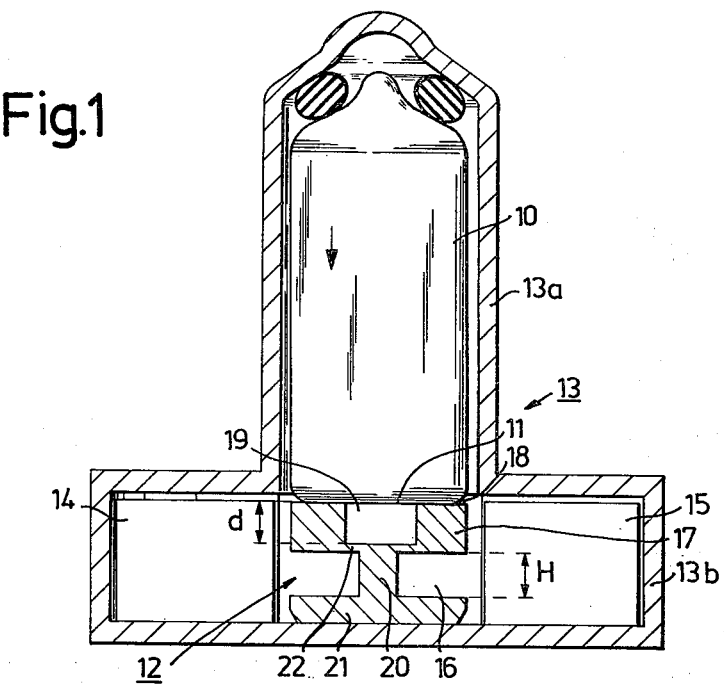
FIG. 1 shows a longitudinal sectional view through an embodiment of an acceleration activated battery according to the invention, before the yielding of the retainer and activation of the battery.

In FIG. 1 reference numeral 10 designates a generally cylindric glass ampule containing electrolyte, which ampule bears with its plane bottom exterior surface 11 against the upper surface of a retainer 12. Thus, the upper surface of the retainer 12 faces the exterior surface of ampule 10. The ampule 10 is situated within an envelope 13 having an upper substantially cylindric part 13a, where the ampule is situated, and a lower part 13b, also of cylindric shape and having an essentially larger diameter than the upper part 13a. In the latter part 13b there are a number of inwardly open compartments, which are defined between radially arranged partition walls, and in each such compartment there is a stack of cell plates, of which two diametrically opposite cell stacks 14 and 15 are visible in the drawing. The retainer 12 for the ampule 10 is placed in the central space 16 inside of the radially arranged compartments containing cell stacks. The battery cell stack is thus in fluid communication with the exterior surface of the ampule, so that when the ampule is broken the liquid electrolyte therein will flow into the cells.

According to the invention the retainer 12 consists of a support plate 17 having a substantially plane upper surface 18, in which an aperture 19 is cut to a certain depth d, which plate is supported by a support pin 20. The support pin is in turn supported from the bottom of the envelope 13 via a foot portion 21. The support plate 17, the support pin 20 and the foot 21 can suitably, as shown in the given example, be made in one piece and for example manufactured by turning. The support pin 20 is situated opposite the aperture 19 in the plate and has smaller transverse dimensions than the aperture so that it can penetrate through the aperture. The connection between the support pin 20 and the plate 17 consists of a ring-shaped thin material connection part 22, which has been left at the turning operation. By accurate manufacturing, very reproducable values can be achieved regarding the force needed to break the connection. The distance H between the lower surface of the support plate 17 and the upper side of the foot 21 is larger than the depth d of the aperture.

Figure 2:
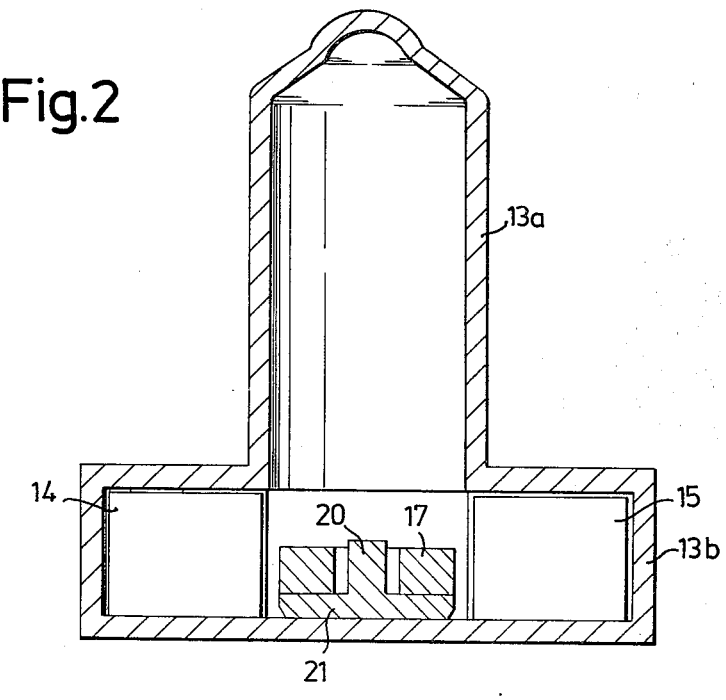
FIG. 2 shows a corresponding longitudinal sectional view through the same battery after activation.

The battery is mounted in a projectile such that the arrow in FIG. 1 is directed opposite to the direction of motion of the projectile. At the firing of the projectile the weakened connection part 22 is subject to a force, which corresponds to m.a, where m is the weight of the ampule and support plate and a is the acceleration. The strength and dimensions of the connection part 22 are chosen so that it will yield at an acceleration of for example 20,000 g, which is substantially half the maximum value of the acceleration at firing. The ampule and support plate will then fall down to the position shown in FIG. 2 and will, when they reach this position, have a kinetic energy corresponding to m.a.H. This energy will be taken up as pressure between the pin and the bottom of the ampule, so that the ampule then will be broken.

We claim:

1. An acceleration activated battery, comprising:
   an ampule having an exterior surface;
   a liquid electrolyte contained in the ampule;
   a battery cell stack, in fluid communication with the exterior surface of the ampule;
   a retainer arranged for supporting the ampule when the battery is unactivated and for breaking the ampule, thereby activating the battery, when a predetermined acceleration force is exerted on the ampule in a given direction;
   wherein the retainer comprises:
      a support plate having an upper surface facing said exterior surface of the ampule and for supporting the ampule, said surface being disposed substantially transverse to the direction of the force; a lower surface; and an aperture cut through the upper surface and having a bottom at a predetermined depth, said aperture being cut downward substantially along the direction of the force;
      a support pin for supporting the support plate, disposed opposite the aperture, and having transverse dimensions smaller than the transverse dimensions of the aperture so that the pin can penetrate through the aperture;
      a foot portion for supporting the support pin, having an upper side, arranged such that the distance from the lower surface of the support plate to the upper side of the foot is greater than the depth of the aperture; and
      a connection part disposed between said pin and said plate, by means of which the support pin supports the support plate, and having a strength such that the connection part will yield when the predetermined force is exerted on the retainer;
   whereby, when the predetermined force is exerted on the ampule by acceleration of the battery, the connection will yield, the ampule will move relative to and toward and foot portion, and the ampule will then contact the pin and release the electrolyte to flow into the battery cell stack.

2. A battery as claimed in claim 1, wherein the connection part between the support plate and the support pin is situated in a plane which is substantially perpendicular to the direction of the force.

3. A battery as claimed in claim 2, wherein the connection part between the support plate and the support pin is formed as a ring-shaped thin material extending from the upper side of the support pin, to the lower surface of the support plate, the pin and at least a portion of the connection part forming the bottom of the aperture.

4. A battery as claimed in claim 3, wherein the support plate, the connection part and the support pin are part of a unitary element.

5. A battery as claimed in claim 1, 2, 3, or 4, in which the ampule is generally cylindrical and has a substantially plane bottom, wherein the plane bottom bears against the support plate, and both the aperture and the support pin are arranged substantially centrally in the plate.

* * * * *